US010404560B2

(12) United States Patent
Johannes et al.

(10) Patent No.: US 10,404,560 B2
(45) **Date of Patent: *Sep. 3, 2019**

(54) DISCONNECTION DIAGNOSIS

(71) Applicant: Hirschmann Automation and Control GmbH, Neckartenzlingen (DE)

(72) Inventors: Christian Johannes, Aichtal (DE); Rami Shouani, Tuebingen (DE); Dirk Mohl, Esslingen (DE); Jochen Dolezal, Denkendorf (DE)

(73) Assignee: Hirschmann Automation and Control GmbH, Neckartenzlingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,118

(22) Filed: Aug. 28, 2017

(65) Prior Publication Data

US 2018/0048547 A1 Feb. 15, 2018

Related U.S. Application Data

(63) Continuation of application No. 13/994,767, filed as application No. PCT/EP2011/072929 on Dec. 15, 2011, now Pat. No. 9,769,041.

(30) Foreign Application Priority Data

Dec. 15, 2010 (DE) ........................ 10 2010 054 645

(51) Int. Cl.
*H04L 12/26* (2006.01)
*H04L 12/437* (2006.01)
(Continued)

(52) U.S. Cl.
CPC .......... *H04L 43/0823* (2013.01); *H04L 1/203* (2013.01); *H04L 12/40182* (2013.01);
(Continued)

(58) Field of Classification Search
CPC .................................................. H04L 12/2697
See application file for complete search history.

(56) References Cited

U.S. PATENT DOCUMENTS 6,430,151 B1 8/2002 Glas
6,721,357 B1 * 4/2004 Zhang ................ H04L 25/4927 375/222

(Continued)

OTHER PUBLICATIONS

Notice of Allowance on U.S. Appl. No. 15/688,118 dated Jan. 9, 2019.

(Continued)

*Primary Examiner* — Guang W Li
(74) *Attorney, Agent, or Firm* — Foley & Lardner LLP; Daniel Rose

(57) ABSTRACT

Method for operating a network having a prescribable topology, wherein the topology contains a plurality of network devices which are connected to one another and interchange data via multiwire data lines connected to their data ports, wherein test messages are also sent to the data lines in order to check whether or not two data ports on two network devices have the connection between them via the interposed data line, characterized in that, in a prescribable time interval, the number of CRC errors which have occurred and the number of data items transmitted in this time interval are ascertained on a data line between two data ports, and at least these two values are used to calculate an error rate which is a measure of the operability of the multiwire data line.

16 Claims, 1 Drawing Sheet

(51) Int. Cl.
*H04L 12/40* (2006.01)
*H04L 1/20* (2006.01)
*H04L 12/24* (2006.01)
*H04L 1/00* (2006.01)

(52) U.S. Cl.
CPC ........ *H04L 12/437* (2013.01); *H04L 43/0811* (2013.01); *H04L 43/50* (2013.01); *H04L 41/06* (2013.01); *H04L 43/10* (2013.01); *H04L 2001/0095* (2013.01)

(56) References Cited

U.S. PATENT DOCUMENTS

| | | | | |
|---|---|---|---|---|
| 6,907,485 | B2 | 6/2005 | White | |
| 6,912,196 | B1* | 6/2005 | Mahalingaiah | H04L 12/437 370/216 |
| 8,566,655 | B2 | 10/2013 | Werner et al. | |
| 8,566,682 | B2* | 10/2013 | Gower | H04L 1/24 370/242 |
| 2002/0021682 | A1* | 2/2002 | Ariyoshi | H04W 52/08 370/335 |
| 2004/0088403 | A1* | 5/2004 | Aggarwal | H04L 41/0681 709/224 |
| 2004/0088405 | A1* | 5/2004 | Aggarwal | H04L 41/069 709/224 |
| 2004/0158781 | A1 | 8/2004 | Pihet | |
| 2004/0187067 | A1* | 9/2004 | Kim | G06F 11/1004 714/768 |
| 2005/0086336 | A1* | 4/2005 | Haber | H04L 1/243 709/223 |
| 2005/0171994 | A1* | 8/2005 | Proano | H04L 43/0823 709/200 |
| 2007/0014341 | A1 | 1/2007 | Rowse et al. | |
| 2007/0049990 | A1* | 3/2007 | Klostermann | A61N 1/37252 607/60 |
| 2007/0088974 | A1* | 4/2007 | Chandwani | G06F 11/0781 714/6.11 |
| 2008/0214230 | A1* | 9/2008 | Shinozaki | H04B 7/022 455/522 |
| 2008/0221918 | A1* | 9/2008 | Petersen | G06Q 50/22 705/2 |
| 2009/0287970 | A1* | 11/2009 | Iizuka | H04L 1/0002 714/704 |
| 2010/0002588 | A1* | 1/2010 | Cantwell | H04L 43/18 370/241 |
| 2011/0134848 | A1* | 6/2011 | Tamaki | H04B 7/0417 370/328 |
| 2011/0264974 | A1* | 10/2011 | Werner | H04L 1/20 714/746 |
| 2014/0152456 | A1* | 6/2014 | Olson | E21B 47/12 340/853.2 |

OTHER PUBLICATIONS

U.S. Office Action on U.S. Appl. No. 13/994,767 dated Feb. 2, 2016.
U.S. Office Action on U.S. Appl. No. 13/994,767 dated Jul. 16, 2015.

* cited by examiner

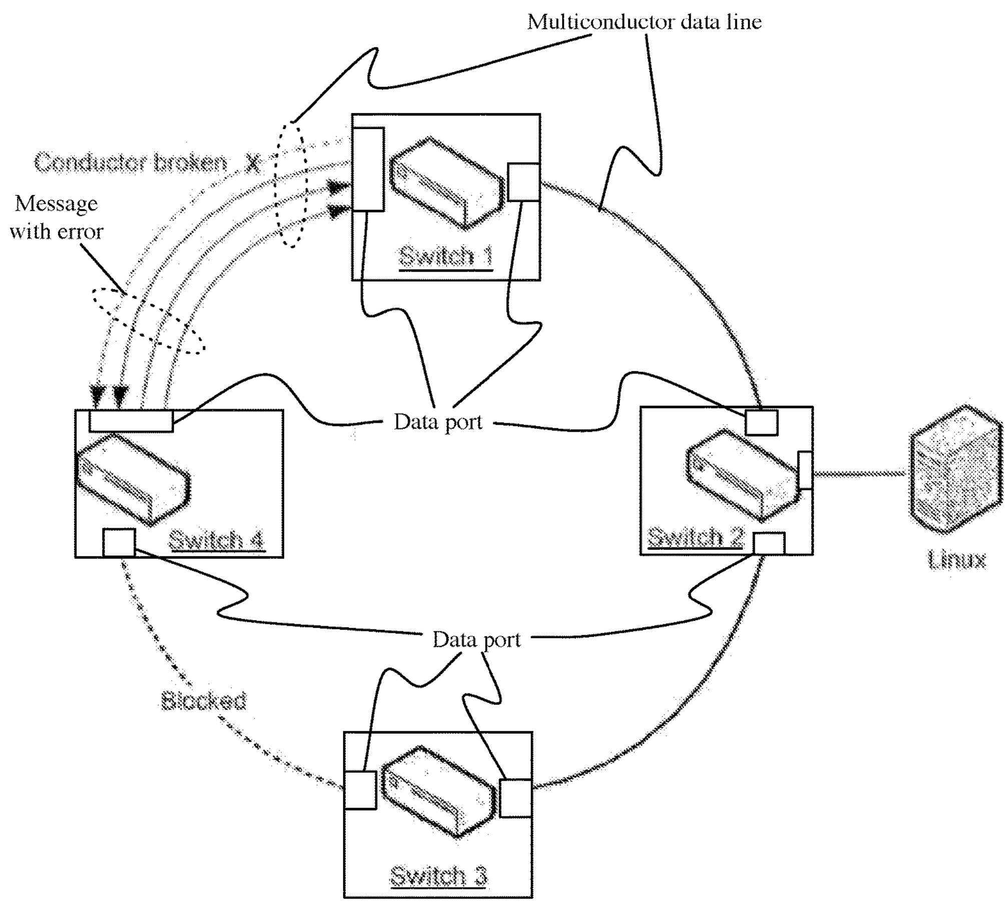
Multiconductor data line
Conductor broken X
Message
with error
Switch 1
Data port
Switch 4
Switch 2
Linux
Data port
Blocked
Switch 3

DISCONNECTION DIAGNOSIS

RELATED APPLICATIONS

The present application claims the benefit of and priority as a continuation to U.S. patent application Ser. No. 13/994,767, entitled "Disconnection Diagnosis," filed Sep. 16, 2013; which claims priority as a national stage application under 35 U.S.C. § 371 to P.C.T. Application No. PCT/EP2011/072929, entitled "Wire Breakage Diagnosis," filed Dec. 15, 2011; which claims priority to German Patent Application No. 10 2010 054 645.3, entitled "Aderbruch-Diagnose," filed Dec. 15, 2010; the entirety of each of which are hereby incorporated by reference.

BRIEF DESCRIPTION OF THE DRAWINGS

The details, objects, aspects, features, and advantages of various embodiments of the invention are set forth in the description below and accompanying drawings, in which:

FIG. 1 is an illustration of a network comprising a ring topology, where switches 1 through 4 serving as network devices are interconnected through data lines, according to one implementation.

The features and advantages of the present invention will become more apparent from the detailed description set forth below when taken in conjunction with the drawings

DESCRIPTION

The invention relates to a method of operating a network having a predetermined topology, where a plurality of network devices is provided within the topology that are interconnected through multiconductor data lines connected to their data ports for the exchange of data, where furthermore test messages are sent via the data lines to check whether the connection through the interposed data line does or does not exist between the data ports of two connected network devices.

Network devices in a network having a predetermined topology each usually have at least one, usually two (in particular in a ring topology) data ports, two of the network devices being interconnected through a data line between their respective data ports to communicate through them, that is, exchange data. An exchange of data means that electrical signals are sent through data lines in the form of data packets.

In order to ensure that the network operates and functions reliably in a network topology, it is necessary that a data connection always exist between two network devices so as to allow data to be exchanged between these two network devices.

A situation repeatedly occurs in practice where the data connection between two network devices is either completely or partially interrupted. Complete interruption can occur, for example, due to the fact that a plug connector has been pulled out of the data port of one of the network devices, or from the data line having been completely severed. A partial interruption generally occurs when a plug connector has not been properly inserted into the data port, or the data line has been pinched or crushed.

The above-described error states can be clearly detected by test messages that are sent through the data lines and analyzed. This is implemented, for example, by a method such as that described in DE 198 10 587 [U.S. Pat. No. 6,430,151]. This discloses a network, in particular, an Ethernet network, that has redundancy properties. A redundancy manager that is connected to the ends of the lines of the network uses the test messages to check the state of the network. Whenever the network is interrupted, the redundancy manager connects those lines that are still functional, thereby ensuring the continued operation of the network within milliseconds. A method described in DE 198 10 587 and a corresponding device has been developed, produced, and marketed by the applicant/patentee under the title "HIPERRING."

Practical use has shown that an above-described network having redundancy properties can be operated satisfactorily. It has been found, however, that problems can arise when data is transferred through the data lines between two network devices if a fault is present on the data transmission path, which fault cannot, or cannot reliably, be detected by the known device. Whenever this type of fault is present, the known redundancy manager assumes that the data transfer between the two network device has not been disturbed, and thus does not find any cause to switch over to a different transmission path. Since a switchover has not occurred while a fault still exists, the transmission of data through this defective data line can still occur—with the result that the transmitted data are not transferred error-free from the one network device to the other network device. Data lines currently are composed of multiconductor data lines (for example, Cat 5 or Cat 6 lines). A defect can occur here whereby after an interruption of a single conductor the data transmission continues to be recognized as error-free for the redundancy manager and the connected network devices, whereas this transmission no longer proceeds error-free due to the conductor break. As a result, data packets can, for example, either be completely lost (and the loss is not detected), or can still proceed between individual conductors due to crosstalk effects, even though the data transmission is not per se error-free despite the fact that data has been transmitted.

DE 103 49 600 [US 2004/0158751] discloses a method of testing line faults in a bus system that has at least two bus subscribers that are connected to a databus having at least two bus lines for the purpose of communicating data between them, where the bus subscribers can assume a recessive state or a dominant state, and where an internal high potential and an internal low potential are provided in the bus subscribers, where furthermore the testing of a line fault is performed by the bus subscriber that is in the dominant state, and where again testing continues to be effected by comparing voltage levels on the bus lines with threshold values that relate to the internal high level or the internal low level of the bus subscriber.

The object of the invention is therefore to provide a method of operating a network having a predetermined topology by which errors can be reliably detected in the transmission of data between two network devices. The object, in particular, is to detect conductor breaks in multiconductor data lines and to respond thereto accordingly.

This object is achieved according to the invention by the features of claim 1.

The invention provides an approach whereby the number of CRC errors occurring is determined within a predetermined time interval on a data line between two data ports, and the amount of data (data packets) transmitted during this time interval is determined, and an error rate is calculated from these two values, which rate is a criterion for the functional reliability of the multiconductor data line. In another implementation, the number of CRC errors occurring is determined within a predetermined time interval on a data line between two data ports, the number of frame fragments transmitted or received during this interval is determined, and the amount of data (data packets) transmitted during this time interval is determined; and an error rate is calculated from these three values.

The cyclic redundancy check, abbreviated as CRC, is per se a method of determining a test value for data so as to be able to detect errors when these are either transmitted or stored.

A predetermined method is used to calculate what is known as a CRC value for each data packet, and this value is attached to the data packet. In order to test the data, the same calculation method is applied to the block of data including the attached CRC value. If the result is zero, it can be assumed that the data packet is corrupted. However, various techniques differ from this formula by using approaches, for example, where the calculation is initialized with a predetermined value or the CRC value is inverted prior to transmission.

It is true that CRC per se is designed to detect with high probability errors occurring during data transmission, such as for example those that can be generated by noise on the line. CRCs for serial data transmissions can be implemented very easily in hardware. For example, data transmission through Ethernet as well as most hard disk transmissions are checked using the CRC method. It is not possible, however, to use the CRC method to detect errors during data transmission that have been caused by a conductor break in a multiconductor data line.

The CRC method is thus designed first only to detect random errors. It is not capable of confirming the integrity of the data. This means that it is easily possible in practice for a break in a conductor to result in a situation where a stream of data is generated by the resulting modification where the data stream has the same CRC value as the given message.

The name of the method is based on the fact that the attached value does not have any informational content that is not already contained in the underlying data block. It is thus redundant. CRCs are based on cyclic codes. These are block codes that have the property that each cyclic shift of the bits of a valid code word is also a valid code word.

Calculation of the CRC value is based on polynomial division: the result from the bits transmitted is considered to be a dyadic polynomial.

The bit sequence for the code representation of the data is divided by a previously determined generator polynomial (the CRC polynomial) modulo mod(2), thus leaving a remainder. This remainder is the CRC value. During transmission of the data packet, the CRC value is attached to the original data packet and is transmitted.

In order to verify that the data does not contain errors, the received data packet along with attached CRC value is interpreted as a binary sequence, again divided by the CRC polynomial modulo, and the remainder determined. If no remainder is left, either no error has occurred, or the (highly improbable) error has occurred which in the polynomial representation has the CRC polynomial as a factor.

Care must be taken here to ensure that the ones and zeroes of the communication with CRC do not involve the representation of a number but instead a polynomial. This means that the modulo division with binaries (or numbers in general)—for example, by a network management station—does not produce the correct result.

Data transmission requires certain indispensable agreements. The receiver must first of all know that a reliable transmission of the original data will in fact occur. This cannot be determined solely based on the data stream being received. In addition, the receiver must use the same CRC polynomial as the sender. And finally, the receiver must have the information as to where in the data stream the check-sum is located that is transmitted in addition to the data.

The invention thus utilizes the above-described known CRC method to determine conductor breaks or the like within the multiconductor data line. An appropriate response to this error can be effected depending on the determination and the calculated error rate. In so doing, the invention surprisingly discloses an aspect of the CRC method that is applied as follows. To avoid ambiguity, it must again be clearly stated that the term "conductor break" is understood to refer not only to the physical breakage (interruption) of a conductor (electrical conductor), but instead is understood to include any interruption in general within a strand of the data line. This also includes, for example, a situation whereby a contact has not been, or has not been properly, plugged into an opposing contact in a multipole plug-in connector, where a circuit path has been interrupted in a network device in the region of the data port, and the like. The critical factor is that interruptions in a single strand (transmission path) of the data line can be detected and analyzed, and an appropriate response can be effected as a function of the analysis (activation of a redundancy mechanism). It is not the purpose of the method according to invention to detect a total interruption (due to the fact, for example, that the plug connector has never been inserted, or that the plugged-in data line has been completely severed).

In a development of the invention, the time interval is greater than or equal to 1 second, preferably, greater than or equal to 5 seconds, and furthermore preferably greater than or equal to 10 seconds. This value of 1, 5, or 10 seconds is especially advantageous for networks, in particular, ring networks, since a time interval is thereby provided that is large enough to count a sufficient number of CRC errors and the transmitted data packets, and calculate the error rate therefrom. This time value is also especially advantageous when using Ethernet ring networks since this time interval is, on the one hand, large enough to determine sufficiently reliable data, while on the other hand not overloading the computing capacity of the computer units in the network devices or in a ring redundancy manager.

In a development of the invention, an error rate of greater than or equal to 1000 PPM (corresponding to 0.1%) constitutes a conductor break in the data line. This is a threshold value for the error rate. Whenever this threshold value is exceeded, it is assumed that a conductor break exists in the data line and the transmission of data is no longer proceeding error-free between the associated ring ports of the two network devices, despite the fact that the two affected network devices and/or the ring redundancy manager have not yet, or not at all, detected this error. This value for this error rate can obviously vary to the up or to the down side. A lowering of the error rate in the downward direction, however, has the result that it is possible for error signals to be detected more frequently and be interpreted as a conductor break, and this can thus result in a situation where the network devices or the ring redundancy manager unnecessarily switches over to other data lines. Raising this threshold value results in a situation where it is possible for already-existing conductor breaks of a multiconductor data line to not be recognized, or not be recognized in timely fashion. This results in a delayed switchover from the defective data line to other data lines that are functioning without errors. As a result, the approach should be considered whereby the error rate can vary within a range of 1000 PPM up to ±20%, thereby both ensuring the reliable detection of conductor breaks, and but also avoiding unnecessary switchovers or excessively frequent switchovers.

In one development of the invention, the conductor break is found by determining the number of CRC errors and the number of transmitted (received) data packets per ring port (data port of the network device) within a specified time interval, and the error rate per received packet is determined by the formula: number of CRC errors plus number of transmitted data, multiplied by a calculation factor, where the result is divided by the amount of transmitted data. In another implementation, the conductor break may be found by determining the number of CRC errors and the number of frame fragments within the specified time interval. The error rate may be determined by dividing (i) a sum of the number of CRC errors and the number of transmitted frame fragments, multiplied by a calculation factor, by (ii) the amount of transmitted data. For example, in one such implementation, the following formula may be utilized:

$$\text{Error rate} = \frac{(etherStatsCRCAlignErrors + etherStatsFragments) * Cf}{etherStatsPkts}$$

with Cf as a calculation factor (e.g. 10,000, or any other such value); etherStatsCRCAlignErrors being the total number of packets received that had a length (excluding framing bits, but including Frame Check Sequence octets) of between 64 and 1518 octets, inclusive, but were not an integral number of octets in length or had a bad Frame Check Sequence; etherStatsFragments being the total number of packets received that were not an integral number of octets in length or that had a bad Frame Check Sequence, and were less than 64 octets in length (excluding framing bits but including Frame Check Sequence octets); and etherStatsPkts being the total number of packets (including error packets) received. An error rate is derived from these calculations using the units PPM, where, as was already explained above, the error rate of greater than or equal to 1000 PPM advantageously constitutes a conductor break in the data line. As a result, error rates of greater than or equal to 1000 PPM (±20%) are interpreted as a conductor break of at least one conductor of the multiconductor data line. The result here is that the data port of this network device is disabled whenever the error rate exceeds the specified threshold value and a switchover is effected to the device's second data port so that this network device remains in the network, in particular, in the ring network, and an exchange of data continues to be possible through this device. When triggered by the error rate's exceeding the threshold value for it, a method is used to disable the associated data port of the affected network device (or of both affected network devices), which method has been disclosed in DE 198 10 587. In addition, other redundancy mechanisms are of course also conceivable in terms of a reaction to the increase in the error rate.

As discussed above, in some embodiments, the calculation factor may be 10,000, since this enables an error rate of 1000 PPM to be achieved relative to the number of CRC errors and the number of transmitted data or data packets. In a development of the invention, the state of the data port is queried externally, in particular, by SNMP. One possible approach is for the state of the data port to be detected and analyzed by its own network device. The respective or affected network device can activate a redundancy mechanism as a function of this detection and analysis. It is more advantageous, however, if the states of the data ports are queried externally, that is, from outside the network device (for example, by a network management station), and the response is effected as a function of this query. This means, for example, that the network management station either continually or at certain time intervals queries the error rates of the individual data ports of the network devices within the network, and that a ring redundancy mechanism is activated whenever the threshold values are exceeded for the individual error rates.

In the event that the data of a data port cannot be queried either by the network device itself, by another network device, or by the network management station, the data port of the neighboring network device that is connected to the defective data port through the data line must be disabled. An approach can be conceived here such that whenever it is determined that the data of a data port cannot be queried, either a direct response, in particular, a switchover is effected, or the data port detected as faulty is not disabled and the redundancy mechanism is not activated until a predetermined number of queries, in particular, three to ten queries has been counted.

Reference is made here to the FIGURE to illustrate the method according to the invention.

FIG. 1 shows by way of example, a network comprising a ring topology, where switches 1 through 4 serving as network devices are interconnected through data lines. Other network devices are also possible instead of switches. In addition, it is also possible for fewer or more (as a rule) to be in the network. A network management station (identified as Linux in the FIGURE) is provided to monitor and control the network devices externally, in particular, to control the data ports of the devices. This network management station is connected to one of the network devices and can communicate through the data ports and the data lines of this network device with the other network devices. A determination is made in the situation illustrated in the embodiment that a conductor is broken in the multiconductor data line between switch 1 and switch 4. This conductor break results in a faulty transmission between these two switches 1 and 4. The requirement here, however, is that the error that is caused by this conductor break not be recognized by a ring redundancy mechanism, such as, for example, that described in DE 198 10 587. As a result, this known ring redundancy manager is not able to respond to the conductor break. For this reason, the method according to the invention is implemented either on one of network devices, on several of the network devices, or on all of the network devices within a network, and/or also on the network management station. If the method according to the invention is thus used to determine that a conductor of the data line is broken between switch 1 and switch 4, the data line is opened between switch 3 and switch 4, which previously was blocked (because the data transmission was functioning between switch 1 and switch 4). This means that the one data port of switch 4, to which the data line to switch 1 is connected, is disabled or blocked, while the data port of switch 4, to which the data line to switch 3 is connected, is enabled or opened. As a result, this data transmission is interrupted, and a switchover is effected to transmission between switch 3 and switch 4 following the detection of the conductor break in the data line between switch 1 and switch 4. This activated ring redundancy mechanism thereby thus ensures that all the network devices can stay in the network and be addressed, or data can be exchanged between them. What is also ensured at the same time is that each network device can continue to be addressed both before the switchover and also following the switchover that resulted from the discovered conductor break.

What is claimed:

1. A method, comprising:

transmitting one or more messages on a first multiconductor data line between a first data port of a first network device and a second data port of a second network device;

determining a number of cyclic redundancy check (CRC) errors that have occurred during a predetermined time interval for the test messages and a number of frame fragments transmitted between the first data port and the second data port;

determining an amount of transmitted data during the predetermined time interval between the first data port and the second data port;

calculating an error rate by dividing (i) a sum of the number of CRC errors and the number of frame fragments, multiplied by a calculation factor; by (ii) the amount of transmitted data; and identifying a lack of functional reliability of the first multiconductor data line, based on the calculated error rate.

2. The method according to claim 1, wherein the calculation factor is 10,000.

3. The method according to claim 1, further comprising disabling the first data port or second data port and activating a redundancy mechanism responsive to identifying the lack of functional reliability of the first multiconductor data line.

4. The method according to claim 1, wherein the test messages comprise simple network management protocol (SNMP) messages.

5. The method according to claim 1, wherein the first network device and second network device are connected to a ring topology network.

6. The method according to claim 5, wherein a connection between the first network device and a third network device of the ring topology network is enabled, responsive to identifying the lack of functional reliability of the first multiconductor data line.

7. The method according to claim 1, wherein the predetermined time interval is greater than or equal to 1 second.

8. The method according to claim 1, wherein identifying the lack of functional reliability of the first multiconductor data line further comprises determining the calculated error rate exceeds 1000 parts per million (PPM).

9. A system, comprising:

a first network device comprising a first data port in communication via a first multiconductor data line to a second data port of a second network device, the first network device configured to:

transmit one or more messages on a first multiconductor data line between a first data port of a first network device and a second data port of a second network device;

determine a number of cyclic redundancy check (CRC) errors that have occurred during a predetermined time interval for the test messages and a number of frame fragments transmitted between the first data port and the second data port;

determine an amount of transmitted data during the predetermined time interval between the first data port and the second data port;

calculate an error rate by dividing (i) a sum of the number of CRC errors and the number of frame fragments, multiplied by a calculation factor; by (ii) the amount of transmitted data; and identify a lack of functional reliability of the first multiconductor data line, based on the calculated error rate.

10. The system of claim 9, wherein the calculation factor is 10,000.

11. The system of claim 9, wherein the first network device is further configured to disable the first data port or second data port and activating a redundancy mechanism responsive to identifying the lack of functional reliability of the first multiconductor data line.

12. The system of claim 9, wherein the test messages comprise simple network management protocol (SNMP) messages.

13. The system of claim 9, wherein the first network device and second network device are connected to a ring topology network.

14. The system of claim 9, wherein the first network device is further configured to enable a connection between the first network device and a third network device of the ring topology network, responsive to identifying the lack of functional reliability of the first multiconductor data line.

15. The system of claim 9, wherein the predetermined time interval is greater than or equal to 1 second.

16. The system of claim 9, wherein the first network device is further configured to determine the calculated error rate exceeds 1000 parts per million (PPM).

* * * * *